United States Patent
Bartczak

(10) Patent No.: US 10,425,655 B2
(45) Date of Patent: Sep. 24, 2019

(54) DECODING SUCCESSIVE MOTION COMPENSATED VIDEO SEQUENCE IMAGES IN PARALLEL USING DATA CORRESPONDING TO MAXIMUM EXTENT OF A MOTION VECTOR

(71) Applicant: Imagination Technologies Limited, Kings Langley (GB)

(72) Inventor: Krzysztof Bartczak, Kielczow (PL)

(73) Assignee: Imagination Technologies Limited, Kings Langley (GB)

( * ) Notice: Subject to any disclaimer, the term of this patent is extended or adjusted under 35 U.S.C. 154(b) by 245 days.

(21) Appl. No.: 13/760,066

(22) Filed: Feb. 6, 2013

(65) Prior Publication Data
US 2013/0215957 A1    Aug. 22, 2013

(30) Foreign Application Priority Data

Feb. 16, 2012   (GB) .................................. 1202720.7

(51) Int. Cl.
*H04N 11/02* (2006.01)
*H04N 19/51* (2014.01)
(Continued)

(52) U.S. Cl.
CPC ........... *H04N 19/51* (2014.11); *H04N 19/436* (2014.11); *H04N 19/44* (2014.11)

(58) Field of Classification Search
CPC ...................................................... H04N 19/51
(Continued)

(56) References Cited

U.S. PATENT DOCUMENTS 8,225,043 B1 *   7/2012   Kohn ................... G06F 12/0875
                                                          711/118
8,498,334 B1 *   7/2013   Choudhary .............. 375/240.01
(Continued)

FOREIGN PATENT DOCUMENTS

CN          101309405 A     11/2008
CN          101822061 A      9/2010
(Continued)

OTHER PUBLICATIONS

Combined Search and Exam Report in GB1202720.7, dated Jun. 18, 2012.

(Continued)

*Primary Examiner* — Leron Beck
(74) *Attorney, Agent, or Firm* — Vorys, Sater, Seymour and Pease LLP; Vincent M DeLuca

(57) ABSTRACT

A compressed motion compensated video sequence is decoded using reference pictures (R) and motion vectors for deriving intermediate pictures (I,B) from reference pictures. The maximum vertical extent of the motion vector corresponds to a number of lines in the image data. A picture derived from the reference picture and motion vectors is decoded once the vertical extent of the reference picture received exceeds the maximum vertical extent of a motion vector from a starting position. Further set(s) of motion vectors for deriving further picture(s) can be received and for each picture to be derived, the image data is decoded using a respective further set of motion vectors after an area of a respective reference picture has been decoded to a maximum vertical extent of a motion vector from a starting position.

16 Claims, 2 Drawing Sheets

Temporal decode of pictures

(51) Int. Cl.
*H04N 19/44* (2014.01)
*H04N 19/436* (2014.01)

(58) Field of Classification Search
USPC .................................. 375/240.01–240.29
See application file for complete search history.

(56) References Cited

U.S. PATENT DOCUMENTS

| | | |
|---|---|---|
| 8,565,315 B2 | 10/2013 | Chikamura et al. |
| 2007/0171975 A1 | 7/2007 | Smith et al. |
| 2009/0034625 A1 | 2/2009 | Komi et al. |
| 2010/0046627 A1* | 2/2010 | Xiao et al. ............... 375/240.23 |
| 2010/0061464 A1 | 3/2010 | Watanabe |
| 2010/0239024 A1 | 9/2010 | Chikamura et al. |

FOREIGN PATENT DOCUMENTS

| | | |
|---|---|---|
| JP | 2006345157 A | 12/2006 |
| JP | 2009033640 A | 2/2009 |
| WO | 2008079041 A | 7/2008 |
| WO | 2009063646 A1 | 5/2009 |

OTHER PUBLICATIONS

Cor Meenderinck et al: "Parallel Scalability of Video Decoders", Technical Report Jun. 30, 2008 (Jun. 30, 2008), XP008139406, DOI 10.1007/S11265-008-0256.
Extended EU Search Report in EP13155280.4 (dated May 27, 2013).

* cited by examiner

Temporal decode of pictures

Temporal decode of pictures

Timing control of multiple cores

DECODING SUCCESSIVE MOTION COMPENSATED VIDEO SEQUENCE IMAGES IN PARALLEL USING DATA CORRESPONDING TO MAXIMUM EXTENT OF A MOTION VECTOR

BACKGROUND

Field

In some aspects, the following relates to methods and apparatus for decoding video images, and in particular to methods and apparatus for decoding compressed motion compensated video images.

Related Art

There are many video compression techniques and some of these are incorporated in standards. The best known is the MPEG standard, which has had several versions since first conception. One of the most commonly used current compression standards is H.264.

Video data typically comprises a sequence of non-interlaced frames or interlaced fields of video data. Typically, compression techniques will allocate every $N^{th}$ frame as a reference frame which will be transmitted in its entirety. Frames between the reference frames are each represented by a set of motion vectors which, when allocated to areas in the reference frame, point to areas in an intermediate frame, which are a best match to the respective area in the reference frame. These motion vectors are usually allocated using a block based matching system in which a series of candidate vectors are assigned to each block and tested to see which gives the best match between a block in a reference frame and a block pointed to by the motion vector. Transmission of sets of these motion vectors with a reference frame enables two or more frames to be transmitted in compressed format since the motion vectors comprise less data than the field or frame which they are used to derive. The compressed frames can either be of I, P or B. I pictures do not reference any other pictures and are known as reference pictures. Both P and B pictures reference other pictures, use motion vectors, and residual data encoded in the current picture to reference to areas in the reference picture and use the residual to add to the reference area to correct any differences between the reference area and the current area. These are known as intermediate pictures. B pictures differ from P pictures in that they can reference two previously decoded pictures rather than one.

In most systems, an intermediate frame is reconstructed at the encoding end of a system and difference data between the reconstructed picture and the actual picture is derived. This can be transmitted as correction data for the field or frame represented by the motion vectors to improve quality at a decoder.

In a straightforward compression system, an intermediate picture will be derived only with reference to a reference picture. However, in more sophisticated systems such as H.264 intermediate fields or frames can be derived using motion vectors, which originate from other reference pictures. These are typically referred to as B pictures. In these systems, it is not possible to decode an intermediate picture which is derived from a preceding picture or uses at least some data from a preceding picture until the data for that preceding intermediate frame has itself been decoded.

SUMMARY

We have appreciated that many video coding/decoding techniques apply a restriction to the maximum extent of a motion vector in the horizontal and vertical directions. We are able to take advantage of this restriction to enable partially parallel decoding of fields or frames where one frame requires data from a previous field or frame in order to properly decode a current field or frame, once decoding of a first frame to the maximum extent of a motion vector has been completed.

In one aspect, there is provided a method and apparatus for decoding a compressed motion compensated video image sequence from image data comprising a plurality of reference pictures and motion vectors for deriving intermediate pictures (I, B) from preceding pictures in the sequence, the motion vectors having a maximum vertical extent corresponding to a number of lines limited data. The method also comprises commencing decoding of each intermediate picture in the sequence once a previous picture in the sequence required to decode the intermediate picture is available over an area which exceeds the maximum vertical extent of the motion vectors from a starting position for decoding of the intermediate picture, and before the whole of the previous picture is available.

In another aspect, a method for decoding a compressed motion compensated video image sequence from image data. The image data comprises a plurality of reference pictures and motion vectors for deriving intermediate pictures from preceding pictures in the sequence. The motion vectors have a maximum vertical extent corresponding to a number of lines of image data. The method comprises receiving a reference picture and a set of motion vectors to derive a next picture in the sequence from the reference picture, decoding the next picture from the reference picture once the vertical extent of the reference picture exceed the said maximum vertical extent of a motion vector from a starting position. The method also comprises receiving a further next set of motion vectors for deriving a further next picture in the sequence from a preceding picture, for each further next picture decoding the image data using its respective further next set of motion vectors when the area of the respective previous picture has been decoded to said maximum vertical extent of a motion vector from a starting position for commencing decoding of the next picture and before the whole of a previous picture is available.

Other aspects include an apparatus for decoding compressed video data, the video data comprising reference pictures and motion vector data for deriving intermediate pictures, the apparatus comprising a first decoder for receiving a picture of video data and for receiving motion vectors for deriving a subsequent picture therefrom. The apparatus comprises a second decoder for receiving the subsequent pictures from the first decoder and for receiving motion vectors for deriving a further picture from the subsequent picture, and means for controlling the second decoder to commence decoding of the further picture when the first decoder has decoded an area of the subsequent picture which exceeds the maximum distance for a motion vector in the vertical and horizontal directions from a starting location for decoding of the subsequent picture and the first decoder has decoded less than the whole of the subsequent picture.

DETAILED DESCRIPTION

In some applications it is desirable to be able to implement functions such as smooth fast forward through video data. At present, fast forward through compressed video data is usually performed by skipping intermediate frames and displaying only the reference frames. This gives a very jumpy image on the screen and makes the fast forward image difficult to view. It also makes it harder to pause fast forward or switch back to play at a precise point in the video sequence.

In order to improve techniques such as smooth fast forward or the decoding of higher resolution video streams it is necessary to decode I, P & B frames completely at a higher rate than is possible with a standard decoder due to the serial nature of the bit stream. Therefore, a parallel approach is desirable. However, parallel decoding of sequential pictures is only possible when a picture is not derived directly from a reference frame. When a picture is derived at least partially using motion vectors from a previous picture a parallel approach will fail because the data from the previous picture is required to decode the current picture, and therefore all the data from the previous picture needs to be available before decoding of a current picture can commence.

Figure 1:
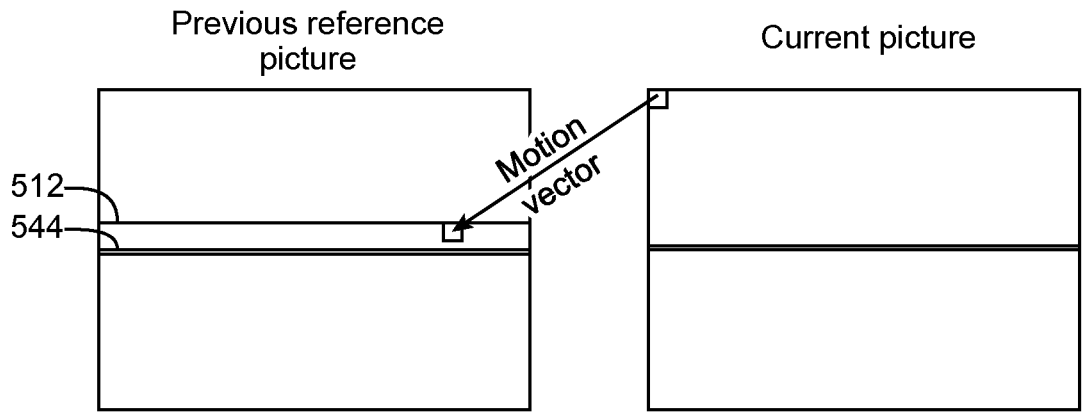
FIG. 1 shows schematically a reference picture and a current picture to be decoded using the reference picture and a set of motion vectors.

In FIG. 1 two fields or frames of an image are shown. For the purpose of this description the term "picture" is used to refer to either a field or a frame. The first, on the left hand side is a reference picture; the second is a current picture, which needs to be decoded using motion vectors from the first picture. Usually, the technique adopted would receive the whole of the left hand picture, or, if it is a motion estimated decoded frame would need to decode the whole of the left hand picture. The right hand picture or current picture to be derived with motion estimation from the left hand picture would be decoded using a set of motion vectors and data from the left hand picture.

In the H.264 coding technique, for streams that are within the defined level 5.1, the maximum vertical extent of a motion vector used to derive a current picture from a previous picture is 512 pixels. This is equivalent to 32 rows of 16×16 pixel macroblocks. Thus, the next line of macroblocks will go from lines 513 to 544. For a high definition picture of 1920 pixels wide by 1088 pixels high, this effectively means that the row of macroblocks commencing after line 512 and ending at line 544 needs to be received or decoded for a previous picture before the first row of macroblocks in the current picture can commence being decoded since a motion vector starting from the row of macroblocks ending on line 544 in the previous picture may be used to derive a macroblock in the first line in a current picture.

Thus, in a decoding system, it is possible to start decoding a picture at time X+1 in a sequence of pictures coded using H.264 when the top half of a picture at time X has been decoded or received up to e.g. line 544, when picture X is used as a reference for picture X+1 to be derived using a set of motion vectors. Obviously, picture X+1 must then be decoded at a rate which is less than or equal to that of picture X to avoid motion vectors being required from areas of picture X which are not yet decoded.

Where the maximum extent of a motion vector is set to be smaller than that shown with reference to FIG. 1, decoding of a current picture can commence earlier, once the previous picture has been received or decoded as far as the row of macroblocks which encompass the maximum extent of the motion vectors permitted between adjacent pictures, and starting from a first row of macroblocks. Thus, it can be seen that the example given in FIG. 1 the current picture (X+1) can start to be decoded once the top half of the previous picture (X) has been received or decoded, where picture X is used as a reference for picture X+1. Thus, in an example of a 1920×1088 pixel picture, once the row of macroblocks ending at line 544 is available, for a picture, the first row of macroblocks in the next picture can start to be decoded using motion vectors from its previous picture. Thus, a partially parallel decoding is possible.

For a decoding system for use with a standard such as H.264 where motion vectors can have the extent shown with reference to FIG. 1, e.g. 512 horizontal lines, the use of two decoding cores operating in parallel will double the rate at which pictures can be decoded. If the maximum vertical or horizontal extent of a motion vector is smaller, i.e. 25% of the vertical extent of the picture, then full pictures could be decoded in parallel using four decoding cores with a second decoding core commencing decoding of a second picture in the sequence once 25% of the first has been received or decoded, a third core commencing decoding of a third picture in the sequence after 25% of the second picture has been decoded, and a fourth core commencing decoding of a fourth picture in the sequence of 25% of a third picture has been decoded.

For the example of FIG. 1, a pair of decoding cores could operate as follows:

1. Core 0 decodes picture 0 from line 1 to line 544
2. Core 0 decodes picture 0 from line 544 to line 1088 and core 1 decodes picture 1 from the top to line 544, using motion compensation and data from picture 0
3. Core 0 receives a next picture to be decoded (Picture 2) and decodes it from the top to line 544 using picture 1 as a reference for motion compensation vectors and core 1 continues decoding picture 1 from line 545 to the bottom continuing to use picture 0 as a reference.

Figure 2:
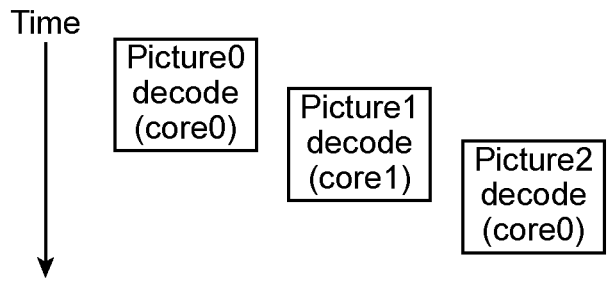
FIG. 2 shows the temporal relationship between decoding of pictures using a pair of motion compensated decoding cores.

The temporal relationship between the decoding of these three pictures is shown in FIG. 2 with time increasing in the direction of the arrow.

Figure 3:
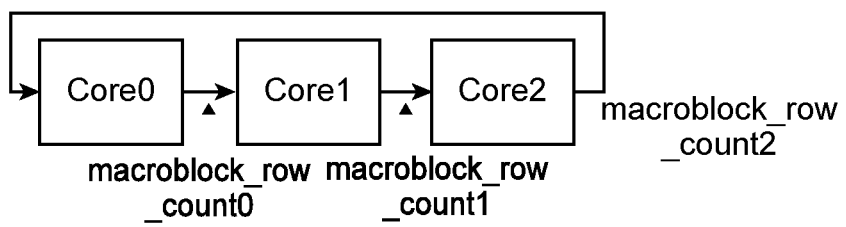
FIG. 3 shows a set of three decoding cores connected in a loop.

In FIG. 3, three cores are shown operating in a ring. Time information from core 0 is supplied to core 1 and timing information from core 1 to core 2 and subsequently timing information from core 2 back to core 0. The number of cores in the loop can be selected in accordance with the number of cores required to give maximum speed of decoding for any given set of transmitted pictures and motion vectors.

Each core outputs a "macroblock row count" after decoding each row of macroblocks. The value of the macroblock row count is only updated after the final block in the row has been decoded and stored in memory. The macroblock row count for a core can then be updated to indicate the number of rows of macroblocks, which have been decoded.

Each core also has a register to store the macroblock row offset. This is the number of macroblock rows, which have to be decoded or received before data from a next picture in the series can commence decoding. Each core subtracts this from a macroblock row offset received from a previous core to determine whether or not it is able to commence decoding of its own picture. Thus, if the remainder is greater than or equal to the row number, which is being processed, and the "picture number" matches, decoding at the next core can commence. If the picture number does not match but the remainder is greater than or equal to row number then this is an indication that the previous core has completed receiving or decoding the previous picture and has started decoding another picture in the sequence. The picture number changes when decoding of a picture has been completed, and is compared with the picture number in the next picture as a control for commencement of decoding.

Figure 4:
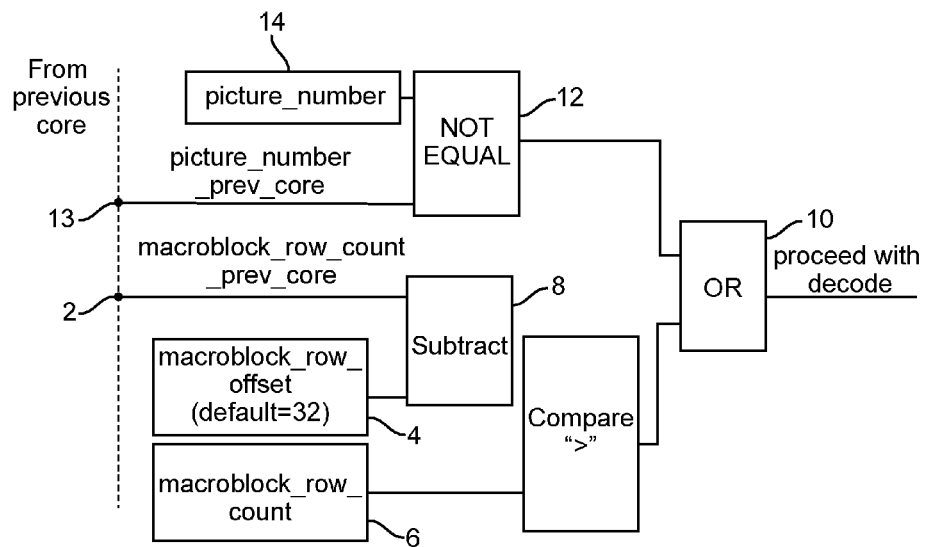
FIG. 4 shows a mechanism for determining when a decoding core dependent on decoding of a previous field or frame should commence decoding.

FIG. 4 shows in more detail example circuitry required within each core to implement this control. As can be seen, FIG. 4 comprises a macroblock row count input 2, and macroblock row offset store 4, and an internal macroblock row count 6. In a subtractor 8, the macroblock row offset core is subtracted from a received macroblock row count 2. The value of this is then compared with the internal macroblock row count 6. If the result of the subtraction is greater than or equal to the number which is being processed from macroblock row count 6 then a positive result is provided to an OR gate 10, the output of which enables an associated core to proceed with decoding. The other input to the OR gate 10 is the result of a not equal comparison unit (exclusive OR gate) 12 which receives a picture number 13 from a previous core and a picture number 14 from the current core. The output of this not equal input is the other gate to the OR gate (non-exclusive) 12. This is because the picture number changes after completion of decoding of a picture. In an improvement on this embodiment, "picture start codes" in the extreme of picture data are identified. This enables data for pictures that are being decoded by a particular core, because of their position in the bit stream, to be sent only to that core. Alternatively, the complete bit stream can be sent to each core with each core discarding the parts of the bit stream that do not form the pictures it has to decode.

An alternative embodiment is as briefly discussed above. In this, a picture with a smaller maximum extent of motion vector is used and this can therefore use more than two cores, according to the maximum extent of the vectors permitted by the encoding system being used.

In a further embodiment, the cores shown in FIG. 3 can be allowed to run asynchronously with respect to when they start processing pictures. Each core can then be controlled by determining from the motion vectors in the picture being decoded whether the area pointed to has already been decoded by another core, and whether or not decoding of a current picture can commence.

Alternatively the macroblock may not reference a previous picture i.e. it is an intra macroblock and in this case it can be decoded regardless of the state of decoding of any other picture.

Using such a technique would enable the speed of decoding to change dynamically in dependence on the maximum extent of the motion vectors detected. Thus, for a very static image decoding of the next image could commence after, say, one or two lines of macroblocks. However, the maximum benefit of the invention would not arise unless it was possible to continue the commencement of decoding of a next image after each further one or two rows of macroblocks and this would require further decoding cores. A maximum extent could still be set on the vectors, e.g. 512 lines.

Thus, it will be appreciated that by enabling motion compensated compressed image data to decode pictures simultaneously, even when a complete previous picture has not yet been decoded, the implementation of features such as fast forward can be improved, as well as the ability to decode higher resolution video streams.

The disclosed features can be used with any motion compensated video standard. Even where there are no maximum limits on the extent of a motion vector, in practice, many will not have motion vectors, which go beyond half a picture (512 lines), and thus these could be implemented using the embodiments of the present invention. Indeed, even for standards, which do permit vectors to go further than 512 lines, the invention may still be used by clipping those vectors to 512 lines to enable implementation of fast forward. The discontinuities apparent from the clipping of vectors will be less visible when fast forwarding through image data and vectors not clipped will give a good representation of the image.

It will be appreciated that the increase in speed of smooth fast forward has been described for a non-interlaced image, since the maximum extent of a motion vector will be fully traversed for a non-interlaced frame as soon as the relevant line of macroblocks has been decoded.

For an interlaced image, a whole field and the half the next field for a current picture will need to be received, up to line 544 in an 1080 line image, before decoding of the next image can commence, for systems where motion vectors are derived from a pair of interlaced fields. Where motion vectors are derived field by field in an interlaced system, i.e. a reference field is the preceding field in the sequence, the system can operate at the same speed as the non-interlaced picture.

For an interlaced picture with 1088 lines, the maximum vertical extent of a motion vector there can only be 256 pixels thus, as with a non-interlaced field; macroblocks up to line 512 of the complete picture have to be processed. This in fact means that 16 rows of macroblocks have to be decoded which for an interlaced field means 272 lines of pixels.

Once these macroblocks have been decoded the interlaced lines from the next field can commence being decoded in the next core. Thus, 2 cores can have the same effect as increasing speed of e.g. smooth fast forward as they can with a non-interlaced signal.

Thus, decoding of an image in the sequence can commence as soon as a previous picture is available up to the maximum vertical extent of a motion vector, and before the whole of the previous picture is available.

Figure 5:
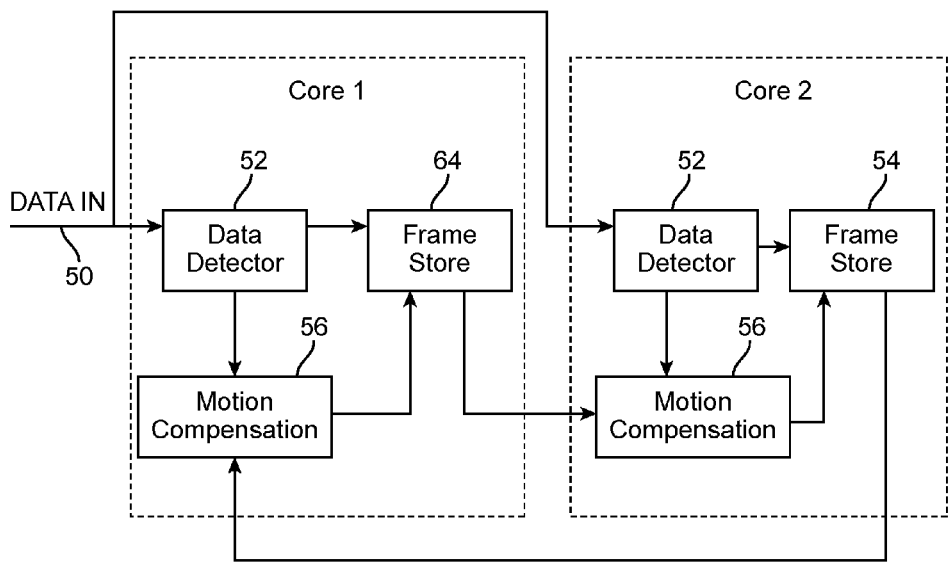
FIG. 5 shows a more detailed block design of a pair of decoding cores.

FIG. 5 shows a more detailed block diagram of the basic units inside a decoder core but without the timing circuitry shown in FIG. 4. Two decoder cores, core 1 and core 2, are shown and these would be suitable for decoding progressive scanned compressed pictures with a maximum vertical motion vector extent of 512 lines in a 1088 line picture.

A stream of data in 50 comprising reference pictures, and motion vectors for intermediate pictures is provided to an input in core 1 and to an input in core 2. In each core, a data detector 52 determines whether data is uncompressed picture data, which can be sent directly to frame store 54, or motion vector data, which needs to be sent to motion compensation unit 56. Timing and control circuitry between the two cores is used to ensure that both cores do not load the same reference frame into their frame store 54 or attempt to decode via motion compensation the same intermediate picture.

The order in which pictures are decoded is as follows: A first reference picture will be loaded into frame store 54 in core 2. The data detector in core 1 will then detect motion vectors for a following picture and will send these to motion compensation unit 56, which also receives the reference picture data from frame store 54. The motion compensation unit 56 in core 1 produces a motion compensated version of the picture from frame store 54 in core 2 and stores it in frame store 54 in core 1. The data detector 52 in core 2 then detects a next set of motion vectors and sends these to its motion compensation unit 56. This also receives the previously decoded picture from frame store 54 in core 1 and produces a next decoded picture to store in frame store 54 in core 2. This process continues until a next uncompressed picture is received and stored in either the frame store 54 in core 1 or core 2, dependant on the timing of its receipt.

The control circuitry shown in FIG. 4 can be used in combination with the circuitry of FIG. 5 to control the decoding performed by core 1 and core 2 such that each respective motion compensation unit commences decoding of a next picture when the area of a previous picture stored in the frame store of the other core exceeds the maximum vertical extent of the motion vectors. There is also control to ensure that this decoding starts as soon as possible after that maximum extent has been reached and with appropriate block selection could be controlled to be on the line immediately following the maximum vertical extent, but more normally would be in the next line of blocks after the blocks which contain the line to which the maximum vertical extent of a motion vector could extend.

Such an arrangement enables decoding of compressed pictures to be performed partially in parallel as decoding can start before the whole of a previous frame is available. Thus, a function such as smooth fast forward can be implemented without skipping frames.

The invention claimed is:

1. A method for decoding a compressed motion compensated video image sequence from image data comprising a plurality of reference pictures and motion vectors for deriving successive pictures in the sequence from preceding pictures in the sequence, the motion vectors having a pre-set maximum vertical extent, $E_{max}$, corresponding to a number of lines of image data, the method comprising:
   receiving, at a first decoding core, image data for deriving a picture in the sequence;
   deriving, at the first decoding core, said picture from the received image data;
   receiving, at a second decoding core, motion vectors for deriving a next picture in the sequence from said picture derived by the first decoding core; and
   controlling when to commence decoding the next picture at the second decoding core, by:
      detecting a respective vertical extent, $m_i$, for each of a number i of the received motion vectors for i blocks of the next picture, the detected vertical extents $m_i$ forming a set of detected values, wherein i≥1;
      determining a largest detected value $m_{largest}$ of the set of detected values $m_i$, wherein the largest detected value $m_{largest}$ is smaller than the pre-set maximum vertical extent $E_{max}$;
      determining that, according to the largest detected value $m_{largest}$ of the received motion vectors for said i blocks, an area of said picture pointed to by the received motion vectors for said i blocks has been decoded; and
      responsive to said determination, commencing decoding, at the second decoding core, the i blocks of the next picture using the received motion vectors for the i blocks, before the first decoding core has completed decoding of a number of lines of the received image data of said picture corresponding to the pre-set maximum vertical extent $E_{max}$.

2. A method according to claim 1 in which the pre-set maximum vertical extent $E_{max}$ of a motion vector is half the vertical height of an image.

3. A method according to claim 1 in which the pre-set maximum vertical extent $E_{max}$ of a motion vector is 512 pixels in an image of 1088 pixel height.

4. A method according to claim 1, in which pictures are decoded in rectangular blocks and decoding of a next picture in said video image sequence commences after a row of rectangular blocks of a preceding picture in the sequence has been decoded containing the determined largest detected value $m_{largest}$.

5. Apparatus for decoding a compressed motion compensated video image sequence from image data comprising a plurality of reference pictures and motion vectors for deriving successive pictures in the sequence from preceding pictures in the sequence, the motion vectors having a pre-set maximum vertical extent $E_{max}$ corresponding to a number of lines of image data, the apparatus comprising:
   a plurality of motion compensation decoding cores connected in a chain, each decoding core having:
      an input configured to receive data comprising reference pictures and motion vectors for deriving additional pictures in said sequence,
      a data detector configured to determine whether received data at said input comprises reference picture data or motion vector data,
      a memory element for storing reference picture data, and
      a motion compensation unit configured to derive decoded pictures from a reference picture and motion vectors;
   wherein the motion compensation unit in the first decoding core in the chain is configured to receive motion vector data from its data detector and reference picture data from a memory element of a last decoding core in the chain, and each other decoding core in the chain is configured to receive, in its motion compensation unit, motion vector data from its respective data detector and reference picture data from a preceding decoding core in the chain; and
   wherein each decoding core is configured to control when to commence decoding of a next picture in the sequence by:
      detecting a respective vertical extent, $m_i$, for each of a number i of the received motion vectors for i blocks of the next picture, the detected vertical extents mi forming a set of detected values, wherein i≥1;
      determining a largest detected value $m_{largest}$ of the set of detected values $m_i$, wherein the largest detected value, $m_{largest}$, is smaller than the pre-set maximum vertical extent, $E_{max}$;
      determining that, according to the largest detected value $m_{largest}$ of the received motion vectors for said i blocks, an area of said respective reference picture pointed to by said received motion vectors for said i blocks of the next picture has been received from a respective memory element, and
      responsive to said determination, enabling its respective motion compensation unit to commence decoding of said i blocks of the next picture before a number of lines of image data of the respective reference picture corresponding to the pre-set maximum vertical extent $E_{max}$ has been received from that respective memory element.

6. Apparatus according to claim 5 in which the pre-set maximum vertical extent $E_{max}$ of the motion vector is half the vertical height of the image.

7. Apparatus according to claim 5 wherein each decoding core comprises control circuitry that enables its respective motion compensation unit.

8. Apparatus according to claim 5 in which the pre-set maximum vertical extent $E_{max}$ of the motion vector is 512 pixels in an image of 1088 pixels high.

9. Apparatus according to claim 5 in which the decoding cores decode pictures in rectangular blocks and decoding of a successive picture in said sequence commences after a decoded row of blocks of a preceding picture in said sequence has been received containing the determined largest detected value $m_{largest}$ of the received motion vectors from a starting position.

10. A method for decoding a compressed motion compensated video image sequence from image data comprising a plurality of reference pictures and motion vectors for deriving successive pictures in the sequence from preceding pictures in the sequence, the motion vectors having a pre-set maximum vertical extent $E_{max}$ corresponding to a number of lines of image data, the method comprising:
controlling when to commence decoding of a successive picture in the sequence by:
detecting a respective vertical extent, $m_i$, for each of a number i of motion vectors for i blocks of a successive picture in the sequence, the detected vertical extents $m_i$ forming a set of detected values, wherein i≥1;
determining a largest detected value $m_{largest}$ of the set of detected values mi, wherein the largest detected value, $m_{largest}$, is smaller than the pre-set maximum vertical extent, $E_{max}$;
determining that, according to the largest detected value $m_{largest}$ of the motion vectors for said i blocks, an area of a preceding picture pointed to by the motion vectors for said i blocks has been decoded by another decoding core; and
responsive to said determination, commencing decoding, in a decoding core, of the i blocks of the successive picture in the sequence before a number of lines of image data of the preceding picture corresponding to the pre-set maximum vertical extent $E_{max}$ has been decoded.

11. Apparatus for decoding a compressed motion compensated video image sequence from image data comprising a plurality of reference pictures and motion vectors for deriving successive pictures in the sequence from preceding pictures in the sequence, the motion vectors having a pre-set maximum vertical extent corresponding to a number of lines of image data, the apparatus comprising:
a plurality of motion compensation decoding cores connected in a chain and configured to receive picture data and motion vector data, said plurality of motion compensation decoding cores further configured to control when to commence decoding of a successive picture in the sequence by:
detecting a respective vertical extent, $m_i$, for each of a number i of motion vectors for i blocks of the successive picture, the detected vertical extents $m_i$ forming a set of detected values, wherein i≥1;
determining a largest detected value $m_{largest}$ of the set of detected values $m_i$ wherein the largest detected value, $m_{largest}$, is smaller than the pre-set maximum vertical extent, $E_{max}$;
determining that, according to the largest detected value $m_{largest}$ of the motion vectors for said i blocks, an area of a preceding picture pointed to by the motion vectors for said i blocks has been decoded by another decoding core, and
responsive to said determination, commencing decoding of the i blocks of the successive picture before a number of lines of the previous picture corresponding to the pre-set maximum vertical extent $E_{max}$ has been decoded.

12. Apparatus according to claim 11, wherein each decoding core comprises circuitry configured to detect that image data of the previous picture in the sequence has become available in an amount that exceeds the determined largest detected value $m_{largest}$ of the motion vectors from the starting position.

13. A method according to claim 1, further comprising:
dynamically changing a speed of decoding the next picture in dependence on the determined largest detected value $m_{largest}$ of the received motion vectors.

14. A method according to claim 10, further comprising:
dynamically changing a speed of decoding of successive pictures in dependence on the determined largest detected value $m_{largest}$ of the motion vectors.

15. A method according to claim 1 wherein said decoding i blocks of the next picture at the second decoding core comprises decoding a row of blocks of the next picture using the motion vectors for the blocks of the row, wherein the decoding of said row of blocks of the next picture commences once the number of rows of blocks of said picture that have been decoded by the first decoding core is greater than a row number of said row of blocks of the next picture by at least the determined largest detected value $m_{largest}$ of the received motion vectors for the blocks of the row.

16. Apparatus according to claim 5 wherein each decoding core is configured to enable its respective motion compensation unit to commence decoding of a row of blocks of the next picture using the motion vectors for the blocks of the row once the number of rows of blocks of said respective reference picture that have been decoded by the first decoding core is greater than a row number of said row of blocks of the next picture by at least the determined largest detected value $m_{largest}$ of the received motion vectors for the blocks of the row.

* * * * *